United States Patent
Schantz et al.

(10) Patent No.: US 7,653,051 B2
(45) Date of Patent: Jan. 26, 2010

(54) SIGNALING GATEWAY AGGREGATION

(75) Inventors: John L. Schantz, Plano, TX (US);
James L. Davis, Plano, TX (US);
Leonard L. Ellis, Dallas, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 894 days.

(21) Appl. No.: 10/757,807

(22) Filed: Jan. 13, 2004

(65) Prior Publication Data

US 2005/0152383 A1    Jul. 14, 2005

(51) Int. Cl.
*H04L 12/66* (2006.01)
(52) U.S. Cl. .................. 370/356; 370/401
(58) Field of Classification Search .......... None
See application file for complete search history.

(56) References Cited

U.S. PATENT DOCUMENTS 6,081,591 A * 6/2000 Skoog ............... 379/230
6,324,183 B1 * 11/2001 Miller et al. ............ 370/467
7,006,433 B1 * 2/2006 Dantu et al. ............ 370/218
2003/0118001 A1 6/2003 Prasad et al.
2004/0022237 A1 * 2/2004 Elliott et al. ............ 370/356

FOREIGN PATENT DOCUMENTS

EP    1054568    12/2001
GB    2369000    5/2002

OTHER PUBLICATIONS

UK Search Report issued May 19, 2005 (3 pages).

* cited by examiner

*Primary Examiner*—Jayanti K Patel
*Assistant Examiner*—Jung Park

(57) ABSTRACT

An arrangement for coupling a SCP (Signaling Control Point) and Signaling Transfer Point (STP) nodes of a SS7 network is disclosed. The arrangement includes an aggregated signaling gateway arrangement (ASGA), which includes at least a first signaling gateway and a second signaling gateway. The first signaling gateway is coupled between the SCP and a first STP node of the SS7 network. The second signaling gateway is coupled between the SCP and a second STP node of the SS7 network, the first signaling gateway and the second gateway being associated with a single SS7 point code.

21 Claims, 8 Drawing Sheets

SIGNALING GATEWAY AGGREGATION

BACKGROUND OF THE INVENTION

SS7 networks have long been employed to carry critical data pertaining to the management of telecommunication networks, such management includes, for example, setting up and tearing down communication sessions as well as the provision of intelligent services. These intelligent services include, for example, 800 number calling, calling card services, cellular phone roaming, and the like. To facilitate discussion, FIG. 1 is a prior art diagram of a typical SS7 network 102, including a plurality of Signaling Transfer Points (STPs) 104, 106, 108, 110, 112. As is well known, a STP functions as a packet switch for SS7 messages. The STPs are interconnected in a mesh network in pairs for redundancy, with the STPs of each pair being identical.

External communication nodes gain access to the SS7 network by connecting to a pair of STPs. For example, switches 120, 122, and 124 gain access to SS7 network 102 by connecting to the pair of STPs 112 and 114 as shown. A Signaling Control Point (SCP) 130 is also shown in the example of FIG. 1. SCP represents a node that contains a service database and application to provide, for example, the aforementioned intelligent services. For example, if a user of a telephone 170 dials an 800 number (e.g., 1-800-123-4567), the routing information for that 800-number call is provided by SCP 130 since the 800 number service involves a virtual telephone number. In this case, switch 120 sends a message to SCP 130 to ask for routing instructions to enable the 800-number call to be set up.

When the SS7 network was originally conceived, the speed of the links between the STPs in the mesh network were relatively slow, typically on the order of 56 Kbits/second. As the network grows, more external communication nodes such as switches are connected to the network. Accordingly, it is not unusual for a STP pair to be connected to tens or hundreds of switches, for example, as the network grows. Since each STP acts as a concentration point into the SS7 network for all the SS7 messages to and from all the external nodes connected to it, the traffic between STPs on the mesh network increases correspondingly over time. Thus as the network grows, the low-speed links between the STPs of the mesh network become a bottleneck to network performance.

Increasing the number of links between STPs represents one approach to solving the SS7 network bandwidth bottleneck problem. However, the SS7 standard places a limit of 16 links between any two nodes (e.g., any two STPs). Consequently, once the limit of 16 links is reached between pairs of STPs, the other way to relieve the bandwidth bottleneck in the SS7 network is to increase the speed of the links.

High Speed Link (HSL) represents one technology that has been adopted by many SS7 network operators for high speed transmission in the SS7 network. The guiding documentation for implementing HSL may be obtained from Telcordia (previously BellCore), and/or ANSI/ITU-T standards. HSL transports SS7 messages over ATM (Asynchronous Transfer Mode) cells employing T1 connections. As is well known, a standard T1 connection supports 24 56-Kbits/second links. However, due to the inefficiency involved in transporting SS7 messages over ATM cells, the actual throughput is on the order of 14 56-Kbits links. In other words, a high overhead penalty is imposed with the use of HSL. However, HSL still offers significantly better performance than the previous 56 Kbits link speed. Consequently, HSL is deemed an acceptable solution for relieving the bandwidth bottleneck among the STPs.

The same bandwidth bottleneck also exists with regards to the links between SCP 130 and the SS7 network, e.g., on links 170 and 172 between SCP 130 and STPs 104 and 106 of the SS7 network. Not surprisingly, as more external communication nodes are connected to the SS7 network and as intelligent services become increasingly popular among telecommunication users, more traffic is sent to and from the SCPs. Again, once the number of links to and from a SCP reaches 32, the other way to increase data throughput to and from a SCP is to increase the speed of the links themselves. Solving this bandwidth bottleneck is also critical for network performance.

While HSL has been a satisfactory interim solution for increasing the transmission speed between STPs in the SS7 network, integrating HSL into the SCPs has proven to be more expensive and difficult than anticipated. In the era of cost-cutting, service providers and network operators chaff at the high development cost involved in such integration, and HSL has not gained acceptance for SCP-to-STP communication in the same way that it has for STP-to-STP communication.

Another approach is to employ a relatively new technology called SS7-over-IP to carry data between the SCPs and the SS7 network. SS7-over IP involves carrying SS7 messages over IP (Internet Protocol) packets and has the potential for very high speeds, e.g., 10 Mbits/second, 100 Mbits/second, or even greater. In fact, some SCPs have developed the capability for transmitting SS7 messages using SS7-over-IP in anticipation of the SS7 network evolution to IP networks. While this may be the ultimate solution for future networks, the proposal to use SS7-over-IP as the transmission technology between a SCP and the SS7 network has not been widely accepted by today's cost-conscious and highly conservative network operators. For one, existing STPs are configured to communicate using HSL, and network operators are highly reluctant to perform the upgrade to enable STPs to communicate using SS7-over-IP, as an alternative or in addition to HSL.

Furthermore, existing SS7 network operators tend to associate IP with lossy transmission and tend to perceive IP to be an unreliable technology for the transmission of critical data, such as SS7 messages. The other considerations are more political but also impact the acceptance of SS7-over-IP by SS7 network operators. SS7 administrators loath to surrender control of their "mission-critical" SS7 networks to IP administrators, who are deemed to be concerned with the maintenance of a lossy IP network geared toward transporting low-priority, non-mission-critical data. SS7 network operators also prefer to keep the transmission of SS7 messages within a dedicated private physical network instead of a public network, such as networks implementing IP.

Accordingly, a new solution is desired to relieve the bandwidth bottleneck between the SCPs and the SS7 network.

SUMMARY OF INVENTION

The invention relates, in an embodiment, to an arrangement for coupling a SCP (Signaling Control Point) and Signaling Transfer Point (STP) nodes of a SS7 network. The arrangement includes an aggregated signaling gateway arrangement (ASGA), which includes at least a first signaling gateway and a second signaling gateway. The first signaling gateway is coupled between the SCP and a first STP node of the SS7 network. The second signaling gateway is coupled between the SCP and a second STP node of the SS7 network, the first signaling gateway and the second gateway being associated with a single SS7 point code.

In another embodiment, the invention relates to a communication network which includes a SS7 network having a plurality of interconnected STP (Signaling Transfer Point) nodes. The communication network includes an application server and an aggregated signaling gateway arrangement (ASGA). The ASGA is coupled between the application server and the SS7 network. The ASGA includes at least a first signaling gateway and a second signaling gateway, the first signaling gateway being configured to transmit and receive SS7 messages with a first STP node of the SS7 network, the second signaling gateway being configured to transmit and receive SS7 messages with a second STP node of the SS7 network. The first signaling gateway and the second signaling gateway communicate with the application server using SS7-over-IP.

In yet another embodiment, the invention relates to a method for transmitting SS7 messages between a SCP (Signaling Control Point) and a SS7 network. The SS7 network includes a plurality of interconnected STP (Signaling Transfer Point) nodes. The method includes providing an aggregated signaling gateway arrangement (ASGA). The ASGA is coupled between the SCP and the SS7 network and includes at least a first signaling gateway and a second signaling gateway. The first signaling gateway is coupled with a first STP node of the SS7 network. The second signaling gateway is coupled with a second STP node of the SS7 network. The method includes employing SS7-over-IP to communicate between the SCP and the first signaling gateway and the second signaling gateway.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF VARIOUS EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Application servers are typically employed by third-party service providers to provide added services (such as calling card services) to users via the existing SS7 network. Application servers are typically small-to-medium sized servers employed to provide a small subset of the services provided by the SCPs. Furthermore, application servers typically communicate using SS7-over-IP since developers of such application servers are typically more comfortable with IP than with HSL, which is more specific to SS7, or traditional low-speed SS7.

Signaling gateways (SGs) have existed in the market place to allow application servers to connect to the SS7 network. Signaling Gateways are small computing devices (such as LAN routers or servers) that allow an application server to provide the aforementioned services to users of the SS7 network. A signaling gateway communicates with its application server using SS7-over-IP and with the STPs in the SS7 network using HSL or traditional low-speed SS7 transmission technologies. Thus a signaling gateway may be thought of as a device that mediates between IP (e.g., SS7-over-IP) and SS7 (e.g., HSL or traditional low-speed SS7 transmission technologies). Typically, signaling gateways are routers/packet switches and load-share the traffic between IP links and HSL links.

Figure 1:
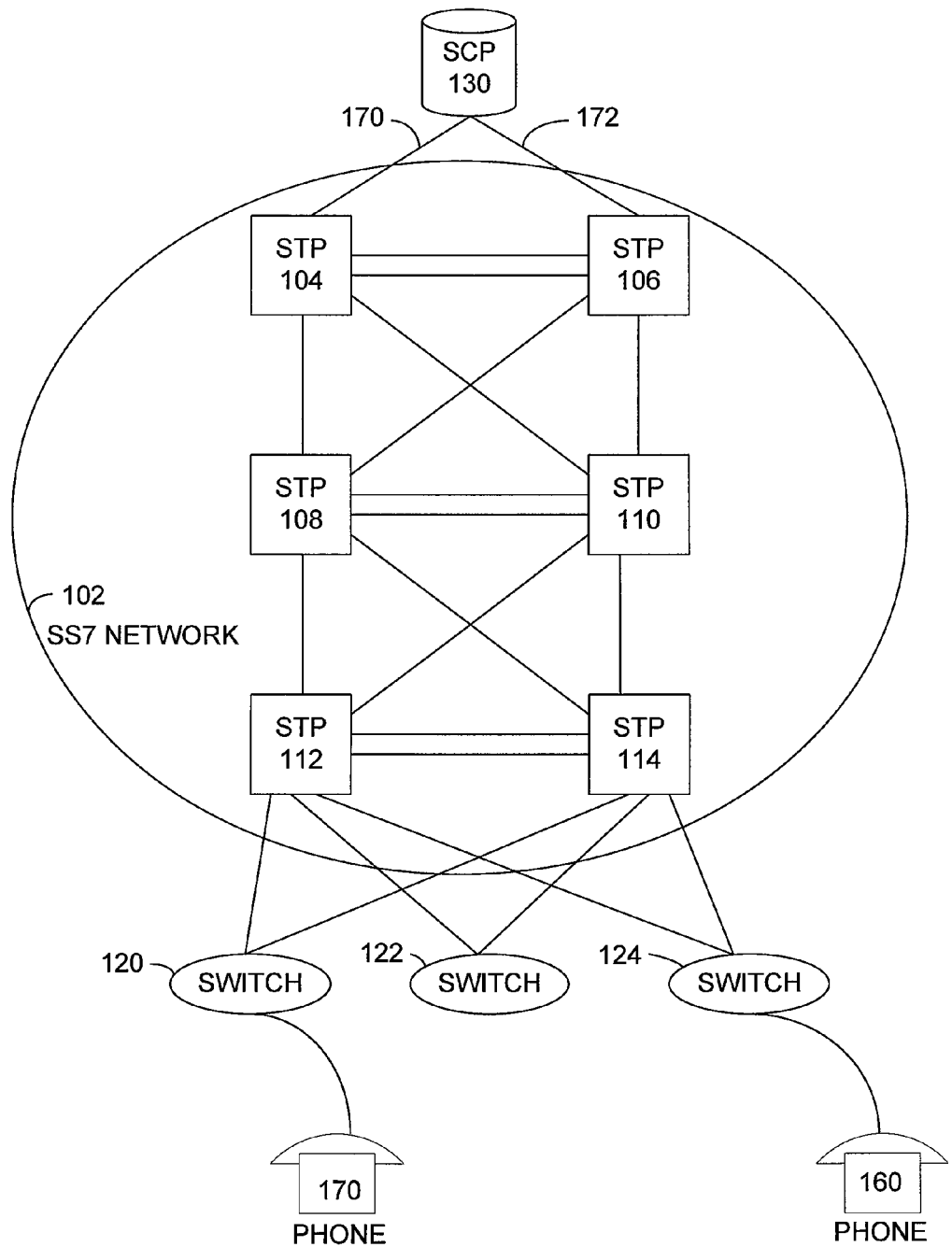
FIG. 1 is a prior art diagram of a typical SS7 network, including a plurality of Signaling Transfer Points (STPs).
Figure 2:
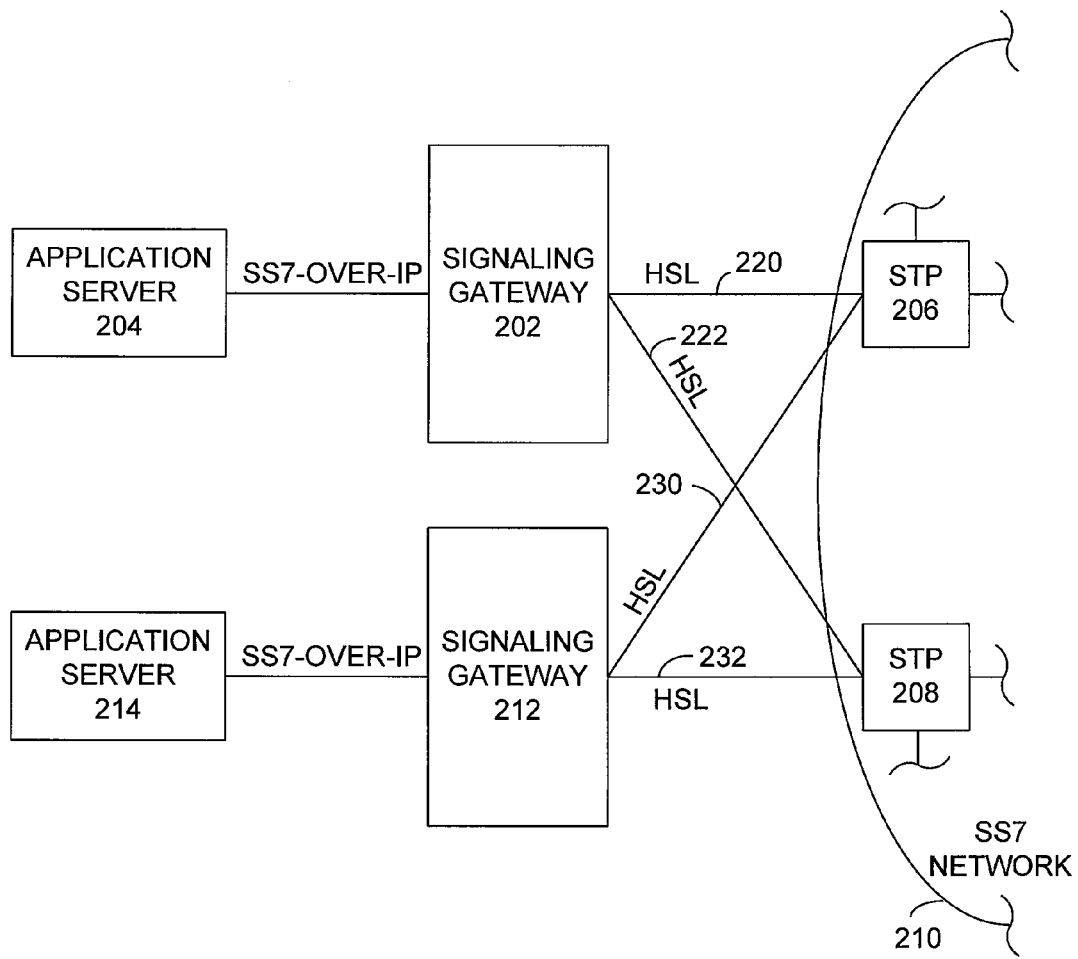
FIG. 2 is a prior art illustration showing a typical SG deployment.

FIG. 2 is a prior art illustration showing a typical SG deployment. In FIG. 2, each signaling gateway is seen as a separate node by the SS7 network. That is, each SG has its own unique SS7 point code just like any other external node that is connected to the SS7 network. A SG is responsible for interfacing an application server with one or more STPs of the SS7 network. As shown in FIG. 2, SG 202 allows application server 204 to connect with STPs 206 and 208 of SS7 network 210 via HSL links 220 and 222 respectively. Likewise, SG 212 allows application server 214 to connect with STPs 206 and 208 of SS7 network 210 via links 230 and 232 respectively.

Because of the inherent limitation in the processing capability of the computing devices employed to implement today's SGs, a typical SG can provide only a few HSL links into the SS7 network. For example, the inventor has observed that a maximum of 8 HSL links is barely achievable per SG. With reference to FIG. 2, the maximum number of HSL links furnished by any one of SGs 202 or 212 into SS7 network 210 is substantially less than the maximum of 32 links (16 links to each STP of the home pair) allowable by the SS7 standard.

While the limitation in the number of high speed links that a SG can provide has not been a problem for application servers, the situation is not the same with respect to SCPs. This is because unlike a typical application server, a SCP typically has the processing capability that can take full advantage of up to 32 HSL links with the STPs of the SS7 network. In fact, network operators fully expect SCPs to possess such processing capacity to handle existing and/or future demand. Accordingly, it is noted by the inventor that if a SG is employed to couple the SCP to the SS7 network in the same manner that a SG is currently employed to couple an application server to the SS7 network, the SG itself becomes the bandwidth bottleneck.

In accordance with embodiments of the present invention, multiple SGs are aggregated to service the bandwidth need of a SCP, i.e., to provide the bandwidth of 32 HSL links. By employing existing SGs in the solution, the built-in translation and multiplexing capabilities between SS7-over-IP links and HSL links are leveraged. By aggregating multiple SGs to service a single SCP, the individual SG's inherent limitation on the maximum number of high speed links can be overcome. Embodiments of the invention employ the aggregated SGs in such a way as to appear substantially transparent to the SS7 network. In other words, since SS7 operators tend to be conservative, the solution provided advantageously requires at most minimal changes to the SS7 network, either individually at the STPs or at the network management level.

Figure 3A:
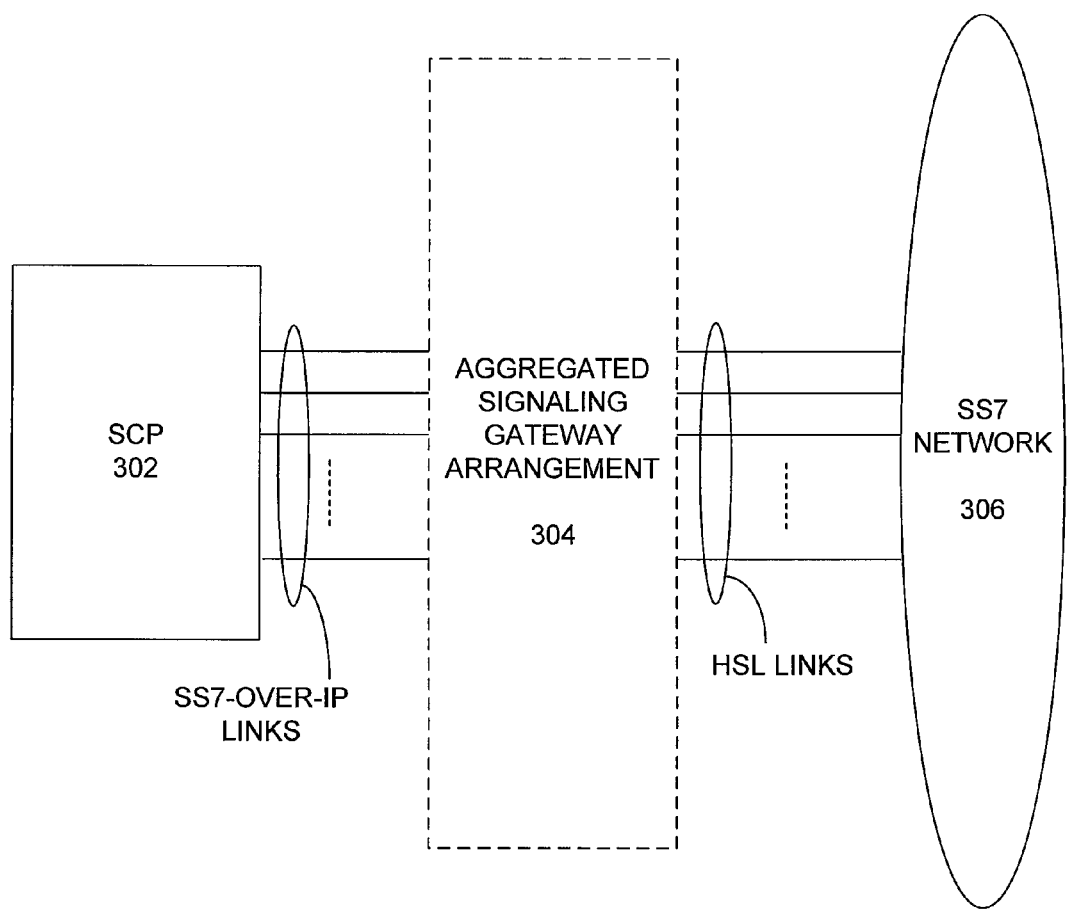
FIG. 3A shows, in accordance with an embodiment of the invention, the high-level architecture of a communication network that employs an aggregated signaling gateway arrangement (ASGA).

FIG. 3A shows, in an embodiment of the invention, the desired high-level architecture wherein a SCP 302 communicate with a SS7 network 306 via an aggregated SG arrangement (ASGA) 304. The ASGA furnishes both the desired translation and multiplexing capabilities found in an individual SG and the high bandwidth throughput above what a single individual SG can provide. The SCP can employ SS7-over-IP links to communicate with the aggregated SG arrangement (ASGA) 304, while the SS7 network 306 can employ HSL links (up to the maximum limit of 32 links, or a maximum of 16 links to each STP of the pair) to communicate with ASGA 304.

From the perspective of the SS7 network, it is desirable that the ASGA is transparent. That is, the SS7 network employs the HSL links as if it is communicating with a SCP that can handle HSL traffic. Conversely, from the perspective of the SCP, it is desirable that the ASGA is also transparent. That is, the SCP employs the SS7-over-IP links as if it is communicating with a SS7 network whose STPs receive data in the SS7-over-IP protocol.

It has been discovered, however, that simply bundling SGs into a bundle and connecting the bundled SGs in the manner analogous to that shown in prior art FIG. 2 will not work. The difficulties encountered and the innovations offered to overcome these difficulties are elaborated below.

In an embodiment, the conventional SG paradigm is changed to enable the ASGA to be employed transparently between the SCP and the SS7 network, each of which is allowed to continue to employ its current communication technology to transmit and receive SS7 messages (i.e., SS7-over-IP for the SCP and HSL for the SS7 network). To elaborate on this innovation, some background discussion is necessary.

In the conventional SG SS7-over-IP paradigm, there is a SCTP (Stream Control Transport Protocol) layer on top of the IP transport layer. The SCTP protocol is a peer protocol to the well-known Transmission Control Protocol (TCP). Transmission Control Protocol (TCP) is responsible for, among other functions, transport reliability, error handling, and congestion control in the Internet for temporary connections. SCTP is a peer protocol to TCP but provides an even higher degree of transport reliability, error handling, and congestion control for long-lived connections and is thus preferred for use with the more mission-critical SS7-over-IP messages.

Above the SCTP layer is a number of SS7-over-IP options, including for example M2UA (MTP Level 2 User Adaptation) and M2PA (MTP Level 2 Peer-to-Peer Adaptation). These level 2 adaptation services manage the pseudo-SS7 links on an individual link-by-link basis and require a MTP level 3 to manage the level 2 links. An alternative to M2UA or M2PA is M3UA (MTP level 3 User Adaptation), which manages multiple IP connections in an SS7-like manner.

It is realized that in the conventional SG SS7-over-IP paradigm, the connections serving as pseudo-SS7 links are defined by data streams within the SCTP connection. From the IP's point of view, there exists at least one high level management stream (e.g., stream 0) and a plurality of data streams in each SCTP connection. Since each data stream in the SCTP connection constitutes a pseudo-SS7 link from the perspective of the M3UA layer, and since load sharing is achieved by using the SLS (Signaling Link Selection), the result is that M3UA service provides simple management of the streams in the SCTP connection.

This approach presents many difficulties when one wishes to aggregate SGs to service a single SCP to provide greater throughput. This is particularly true when additional IP streams are provisioned in an existing IP pipe (e.g., Ethernet connection), when IP streams are removed from an existing IP pipe, when an additional IP pipe is added due to the addition of a new SG in the ASGA, or when an IP pipe is deleted due to the removal of a SG from the ASGA. Furthermore, when a single IP pipe (e.g., Ethernet cable) carries multiple links, reliability decreases and administration overhead increases.

Embodiments of the invention instead treat an SCTP connection (as opposed to an SCTP stream) as a SS7 link itself, irrespective of the number of streams defined in each SCTP connection. In practice, the number of streams is usually negotiated between the SCP and each SG, and in the typical case, only enough streams are defined to service the types of traffic (e.g., sequence, non-sequence, and stream management) since an excessive number of streams in a given SCTP connection unnecessarily adds to the processing overhead.

Figure 3B:
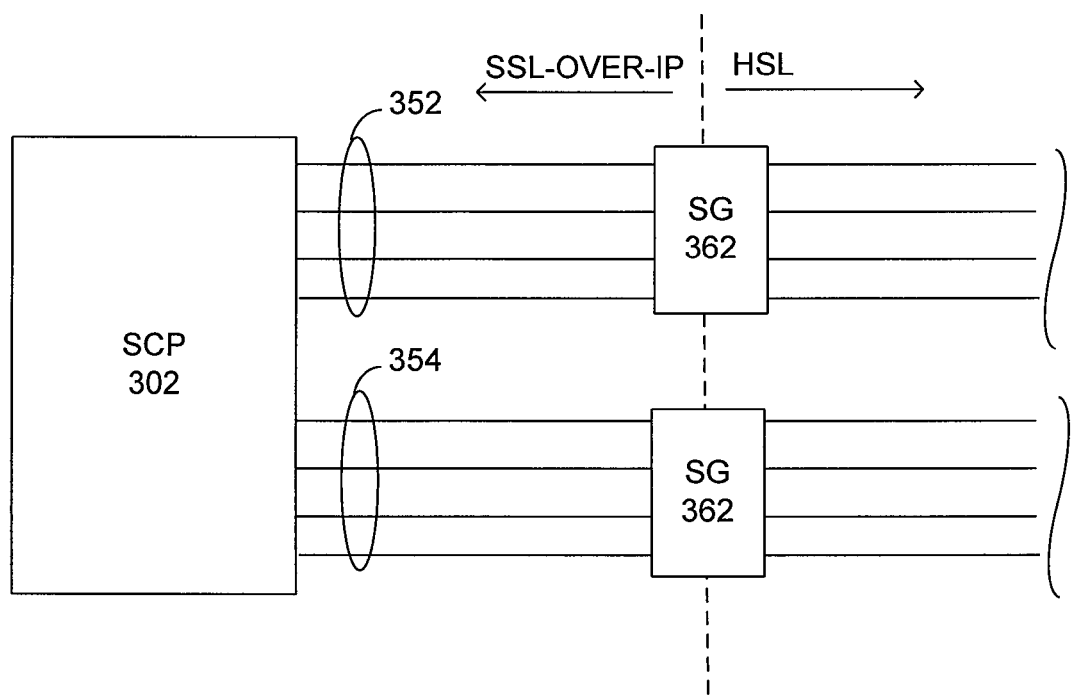
FIG. 3B shows, in accordance with an embodiment of the invention, the links between a SCP and signaling gateways of the ASGA.

With reference to FIG. 3B, each of IP pipes 352 and 354 between SCP 356 and SGs 362 and 364 of the ASGA is treated as one or more SCTP connections (or IP links or SS7 links) irrespective of how many streams there may be in each SCTP connection. This approach of treating each SCTP connection as a SS7 link allows the SCP and more specifically the MTP3 layer in the SCP to manage the SCTP connections as if they are SS7 links in the SS7 link set. Since the MTP3 layer already has a robust set of management functions in comparison to M3UA, it knows how to manage SS7 links in the SS7 link set. This innovation ("merging" MTP3 and M3UA) leverages on the MTP3's existing capability in order to manage the SCTP connections. In this manner, the addition, removal, and load balancing among the SCTP connections can be managed easily and efficiently by the MTP3 layer, rendering it simple to add, remove, or load balance among the SGs in the ASGA. As can be seen from the foregoing, this approach enables the SCP to manage the set of available SS7-over-IP links as if the SGs in the ASGA are substantially transparent (i.e., as if it is talking to a SS7 network that receives SS7-over-IP data).

In another embodiment, an architectural limitation is imposed when there is more than one SG in the ASGA to require each SG to communicate with a single respective STP to enable the ASGA to be employed transparently between the SCP and the SS7 network, each of which is allowed to continue to employ its current communication technology to transmit and receive SS7 messages (i.e., SS7-over-IP for the SCP and HSL for the SS7 network). This is unlike the situation in the prior art (e.g., FIG. 2) wherein a SG is treated as any other external node into the SS7 network and may be connected to multiple (typically at least 2) STPs. Beyond the issue of not wishing to spread the relatively low throughput of a single SG among different STPs, the limitation also eliminates errors that may arise during error recovery situations. Again, some background discussion is necessary to elaborate on this innovation.

Figure 4:
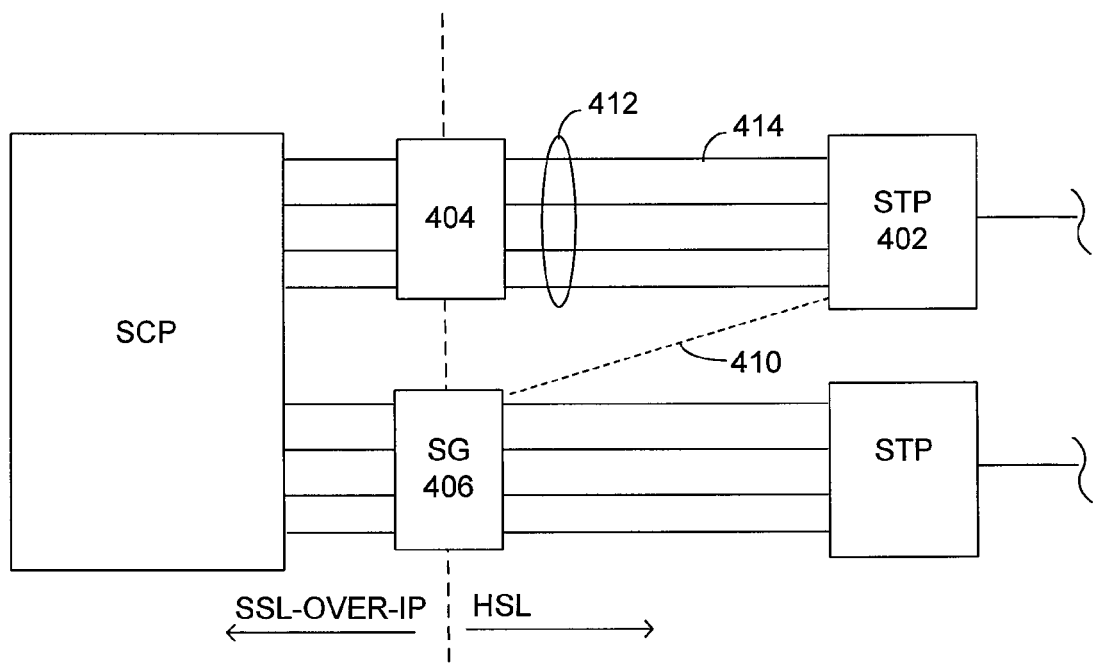
FIG. 4 shows, in accordance with an embodiment of the invention, the links between a SCP and the STPs of the SS7 network, including links to/from signaling gateways of the ASGA.

The SS7 standard, and hence, HSL requires a very high level of error recovery in case a SS7 message is not properly received. Part of the message error recovery strategy (e.g., error due to link failure) involves the transmitting device making an inquiry of the receiving device to identify the last message received by the receiving device. Once the last message received is ascertained, the transmitting device can perform error recovery by re-sending messages still residing in its transmit buffer on an alternate link. With reference to FIG. 4, the transmitting device may represent STP 402, in which case SG 404 acts as the receiving device. Since communication is bi-directional, the transmitting device may also represent SG 404, in which case STP 402 acts as the receiving device.

If multiple SGs are coupled to a single STP, when transmission fails on a HSL, there is a possibility that when the STP makes the aforementioned inquiry, it may send the inquiry using a HSL that is coupled to the wrong SG (i.e., the SG not connected to the HSL that failed). With reference to FIG. 4, this is the situation that exists if there were a hypothetical HSL link 410 to connect SG 406 to STP 402, causing STP 402 to be connected to both SG 406 and SG 402 (via link set 412). If communication fails on HSL link 414 of link set 412, STP 402 may employ HSL link 410 to send an inquiry to SG 406. That SG 406, after it receives the inquiry, would be unable to properly respond. The lack of a proper response will cause the STP 402 to conclude that the messages in its transmit buffer cannot be properly acknowledged and cannot be transferred. The STP 402 will proceed to dump the messages from its transmit buffer, resulting in lost SS7 messages. By limiting one SG for each STP, the aforementioned problem is avoided.

In another embodiment, all SGs of the ASGA have the same point code from the perspective of the SS7 network. This is unlike the situation in the prior art (e.g., FIG. 2) wherein each SG is considered an individual node that is connected to the SS7 network and thus has its own point code to uniquely identify that SG to the SS7 network. In this embodiment of the invention, the point code is actually associated with or "owned by" the SCP. One implication is that the SGs in a ASGA should not know about one another to prevent the situation wherein a SG with a given point code attempts to communicate with another SG having the same point code. Such a communication attempt would violate the SS7 protocol.

In another embodiment, all the active links between a SCP and a STP are of the same type (i.e., all at the low 56 Kbits/second speed or at the higher speed via the SGs). This feature has certain implications during migration, i.e., when upgrading the speed of transmission between a STP and a SCP. Considering the situation in FIG. 5A in which a SCP 502 is connected to a pair of STPs (504 and 506) of the SS7 network using 32 low-speed connections (i.e., 16 56 Kbits/second links to each of STPs 504 and 506). This is the situation that currently exists with today's SS7 networks.

Figure 5A:
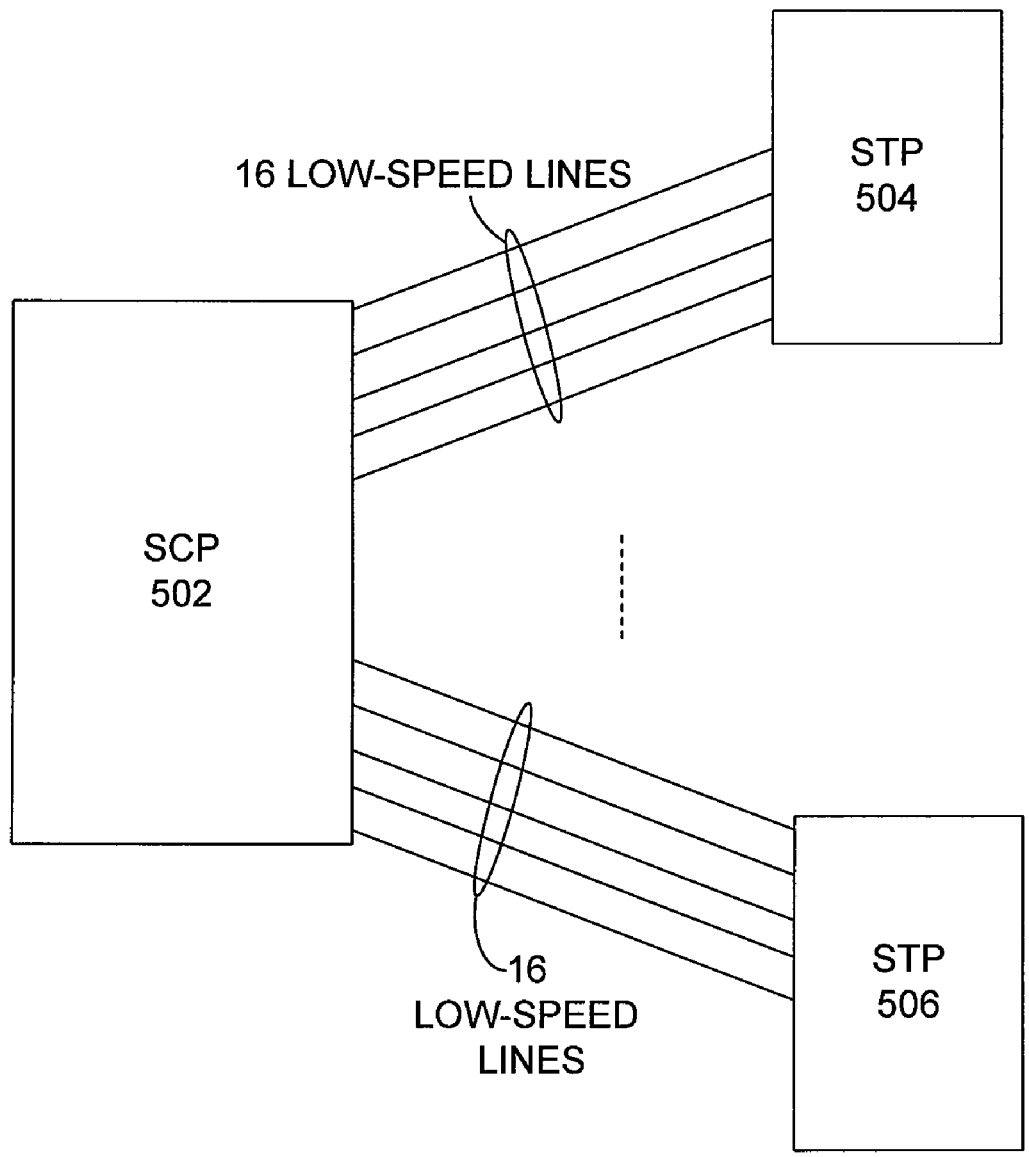
FIG. 5A and FIG. 5B show, in accordance with embodiments of the invention, a migration strategy for upgrading the transmission speed between a SCP and a SS7 network.
Figure 5B:
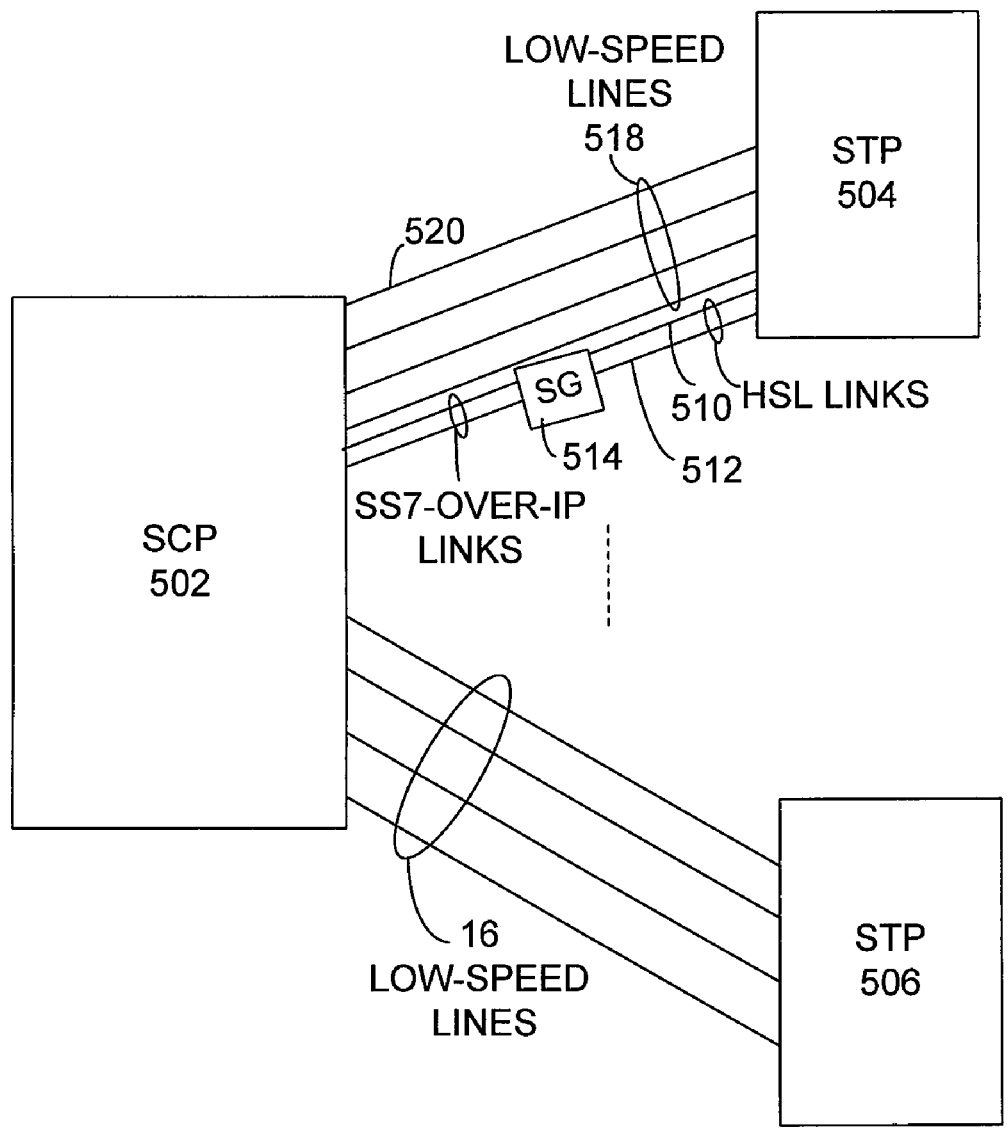

Suppose then that the SS7 network operator wishes to upgrade the transmission speed between the SCP and the SS7 network. FIG. 5A shows in a simplified format the connections between the SCP and the STPs of the SS7 network prior to upgrade. In FIG. 5B, suppose a pair of HSL links 510 and 512 is substituted in, using SG 514, for some of the low-speed links. SG 514 is unaware of the presence of the remaining low-speed links 518. If there is failure on one of the low-speed links, low-speed link 520, the STP 504 may send an inquiry to SG 514 to ask about the last received message. Since SG 514 was not involved in the communication session that involves low-speed link 520, SG 514 would be unable to respond properly, causing STP 504 to dump the messages in its transmit buffer. The converse may also happen if there is a failure on HSL link 510 and STP 504 sends an inquiry directly to SCP 502 using the one of the low-speed links 518. In this case, SCP 502 would be unable to respond properly, again causing STP 504 to dump its transmit buffer.

During migration, in accordance with embodiments of the invention, the low-speed links (e.g., 518) are deactivated when the high speed links (e.g., HSLs 510 and 512) are activated. The low-speed links 518 may be employed for backup, ready to be activated again if the HSLs 510 and 512 fail. This migration approach fulfills the desire of SS7 network operators to be conservative and to have a ready backup should the migration attempt fails. Furthermore, in an embodiment, the migration is performed with only one STP of the STP pair (e.g., only with STP 504) until all migration issues associated with that STP 504 are resolved. The other STP 506 may continue to communicate with SCP 502 using the low speed links. When it is certain that all migration issues associated with STP 504 are resolved, the migration may be performed with respect to STP 506, again keeping its low-speed links deactivated but ready to be activated as a backup.

Figure 6:
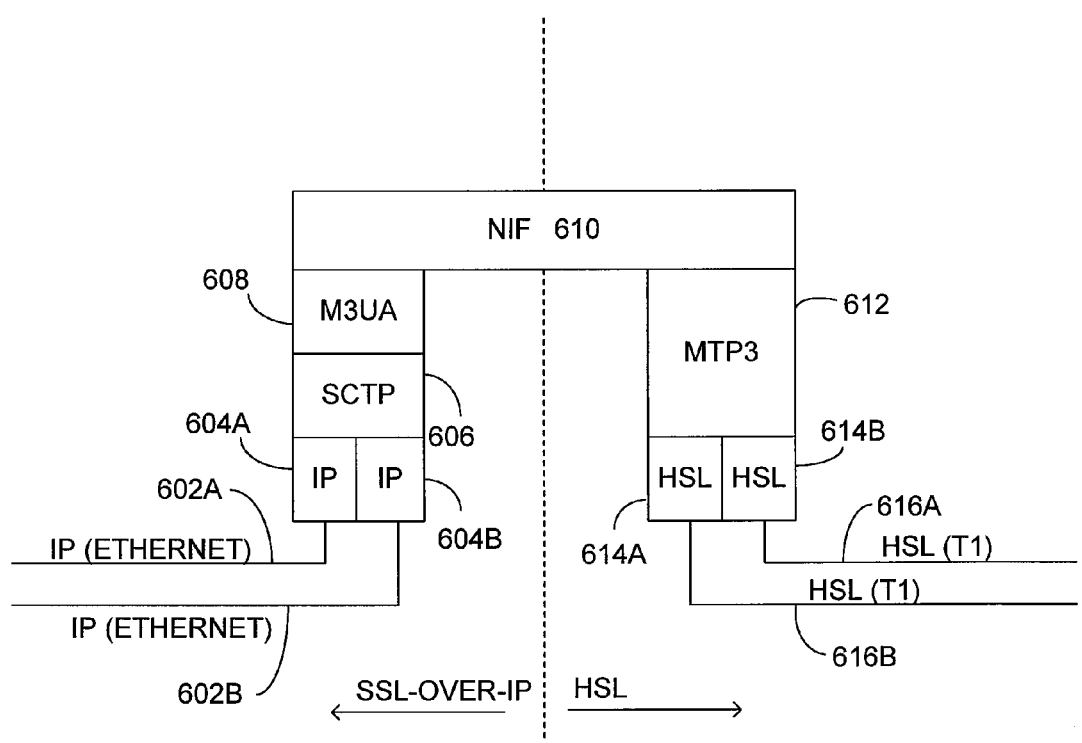
FIG. 6 shows, in accordance with an embodiment of the present invention, a view of the layer stack in the signaling gateway.

FIG. 6 shows a view of the layer stack in the SG. SS7-over-IP data comes in via Ethernet 602 (which could be a single or multiple physical cables) into IP layer 604. The SCTP layer 606 above IP layer 604 controls the SCTP connections which, as mentioned earlier, represent the SS7-over-IP links. The M3UA layer 608 thus manages these SCTP connections as if they are SS7-over-IP links. Node interworking function (NIF) layer 610 includes functions such as converting SS7-over-IP messages into traditional MTP message as well as any other network-level management that enable management messages to pass between the two sides. On the other side, the NIF layer 610 provides messages into the MTP3 layer 612 that manages the multiple HSL links in HSL layer 614, which is then transmitted over T1 connections of which two are shown (616A and 616B).

As can be appreciated from the foregoing, embodiments of the invention aggregate the SGs into an ASGA to take advantage of the individual SG's ability to translate and multiplex between SS7-over-IP and HSL as well as higher throughput provided by multiple SGs. Furthermore, architectural changes and innovative methodologies are provided to enable the SCP and the SS7 network to communicate with one another at a higher bandwidth and in their own protocols (i.e., SS7-over-IP for the SCP and HSL for the SS7's STPs) using the ASGA. Further, even though the ASGA is interposed between an SCP and the SS7 network, the ASGA is substantially transparent to both the SCP and the SS7 network, allowing the network operator to upgrade to a higher transmission speed between the SCP and the SS7 network in a relatively simple manner. Migration methodologies are also proposed to minimize risks to operators wishing to upgrade, thereby making the proposed solution attractive to risk-averse SS7 network administrators.

While this invention has been described in terms of various embodiments, there are alterations, permutations, and equivalents which fall within the scope of this invention. For example, although the ASGA is shown coupling between a SCP and a SS7 mesh network in the examples herein, it should be understood that an ASGA may also be employed to couple the SS7 network with a high-performance application server, i.e., one that provides a subset of the functions of a SCP but has the bandwidth need higher than that which can be provided by a single signaling gateway. As another example, although the ASGA of the figures herein has two signaling gateways, a greater number of signaling gateways may be provided in the ASGA to increase the bandwidth throughput. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement for coupling a SCP (Signaling Control Point) to signaling transfer point (STP) nodes of a SS7 network, comprising:
   an aggregated signaling gateway arrangement (ASGA) including at least a first signaling gateway and a second signaling gateway, said first signaling gateway being coupled between said SCP and a first STP node of said SS7 network, said second signaling gateway being coupled between said SCP and a second STP node of said SS7 network, said first signaling gateway and said second gateway being associated with and sharing a single SS7 point code, an SS7 point code comprising an identification code used to identify a node within an SS7 network.

2. The arrangement of claim 1 wherein said first signaling gateway and said second signaling gateway communicate with said SCP using SS7-over-IP.

3. The arrangement of claim 2 wherein said first signaling gateway communicates with said first STP node using HSL (High Speed Link).

4. The arrangement of claim 3 wherein all communication links employed for transmitting SS7 messages between said first STP node and said SCP traverse said first signaling gateway.

5. The arrangement of claim 2 wherein said ASGA is capable of providing 32 HSL links of bandwidth into said SS7 network.

6. The arrangement of claim 2 wherein all communication links employed for transmitting SS7 messages between said first STP node and said SCP traverse said first signaling gateway.

7. The arrangement of claim 1 wherein each SS7 link between said SCP and said ASGA is mapped onto a SCTP (Stream Control Transport Protocol) connection.

8. A communication network, comprising:
   a SS7 network comprising a plurality of interconnected STP (Signaling Transfer Point) nodes;
   an application server; and
   an aggregated signaling gateway arrangement (ASGA) coupled between said application server and said SS7 network, said ASGA comprising at least a first signaling gateway and a second signaling gateway, said first signaling gateway being configured to transmit and receive SS7 messages with a first STP node of said SS7 network, said second signaling gateway being configured to transmit and receive SS7 messages with a second STP node of said SS7 network, said first signaling gateway and said second signaling gateway communicating with said application server using SS7-over-IP, wherein said first signaling gateway and said second gateway are associated with and share a single SS7 point code, an SS7 point code comprising an identification code used to identify a node within an SS7 network.

9. The communication network of claim 8 wherein said ASGA is capable of providing 32 HSL links of bandwidth into said SS7 network.

10. The communication network of claim 9 wherein said first signaling gateway communicates with said first STP node using HSL (High Speed Link).

11. The communication network of claim 10, wherein all communication links employed for transmitting SS7 messages between said first STP node and said application server traverse said first signaling gateway.

12. The communication network of claim 8 wherein each SS7 link between said application server and said ASGA is mapped onto a SCTP (Stream Control Transport Protocol) connection.

13. The communication network of claim 8 wherein said second signaling gateway communicates with said second STP node using 56 Kbits/second SS7 links.

14. A method for transmitting SS7 messages between a SCP (Signaling Control Point) and a SS7 network, said SS7 network comprising a plurality of interconnected STP (Signaling Transfer Point) nodes, comprising:
   providing an aggregated signaling gateway arrangement (ASGA), said ASGA being coupled between said SCP and said SS7 network and comprising at least a first signaling gateway and a second signaling gateway, said first signaling gateway being coupled with a first STP node of said SS7 network, said second signaling gateway being coupled with a second STP node of said SS7 network, wherein said first signaling gateway and said second gateway are associated with and share a single SS7 point code, an SS7 point code comprising an identification code used to identify a node within an SS7 network; and
   employing SS7-over-IP to communicate between said SCP and said first signaling gateway and said second signaling gateway.

15. The method of claim 14 wherein said ASGA is capable of providing a greater bandwidth throughput into said SS7 network than a maximum bandwidth throughput into said SS7 network of either one of said first signaling gateway and said second signaling gateway.

16. The method of claim 15 wherein said first signaling gateway communicates with said first STP node using HSL (High Speed Link).

17. The method of claim 16 wherein all communication links employed for transmitting SS7 messages between said first STP node and said SCP traverse said first signaling gateway.

18. The method of claim 14 wherein each SS7 link between said SCP and said ASGA is mapped onto a SCTP (Stream Control Transport Protocol) connection.

19. The method of claim 14 wherein said first signaling gateway transmits SS7 traffic to said first STP node using only HSL links.

20. The method of claim 19 wherein said second signaling gateway transmits SS7 traffic to said second STP node using only 56 Kbits/second links.

21. The method of claim 20 wherein said first signaling gateway is coupled to said first STP node via at least one active HSL link and at least one inactive 56 Kbits/second link.

* * * * *